May 28, 1935.  G. R. SIEGRIST  2,003,013
VEHICLE CHASSIS LUBRICATING MECHANISM
Filed Nov. 26, 1929  4 Sheets-Sheet 1
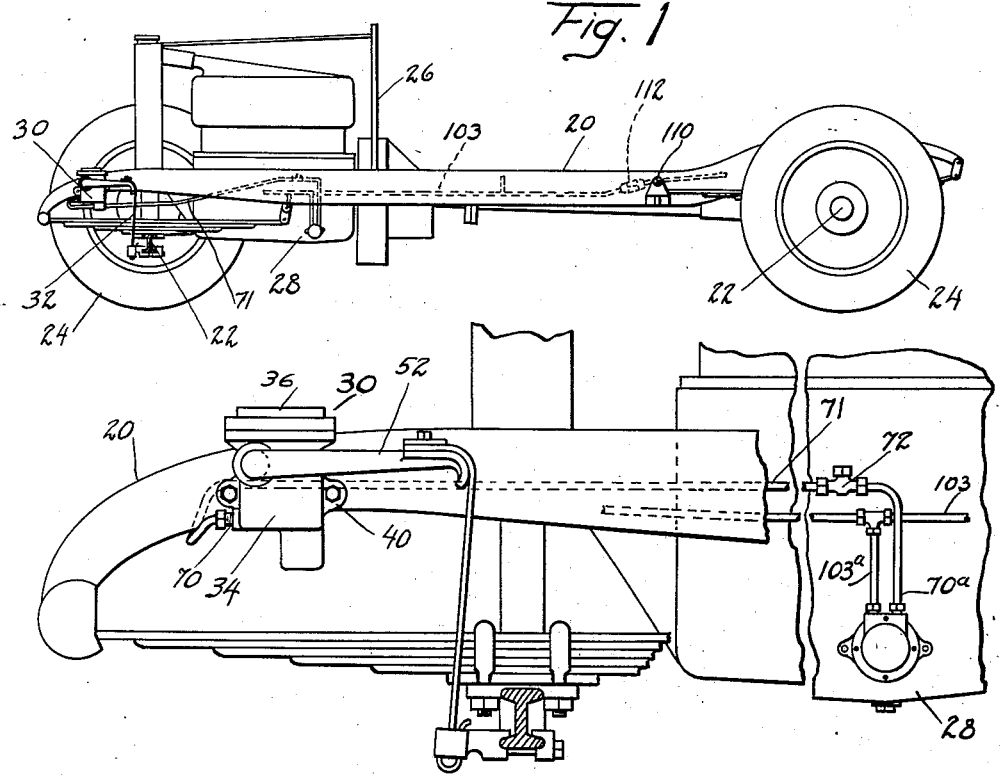
INVENTOR.
George R. Siegrist
BY
Parker & Burton
ATTORNEYS May 28, 1935.　　　G. R. SIEGRIST　　　2,003,013
VEHICLE CHASSIS LUBRICATING MECHANISM
Filed Nov. 26, 1929　　　4 Sheets-Sheet 2
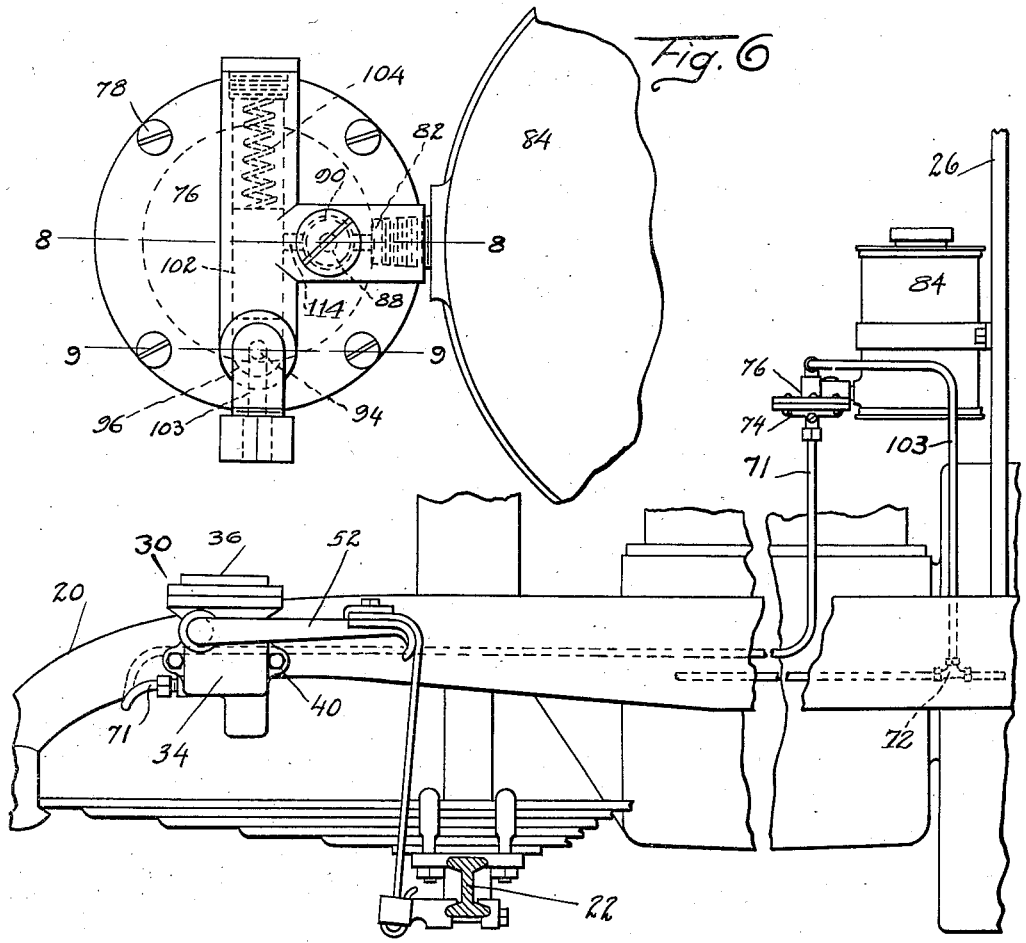
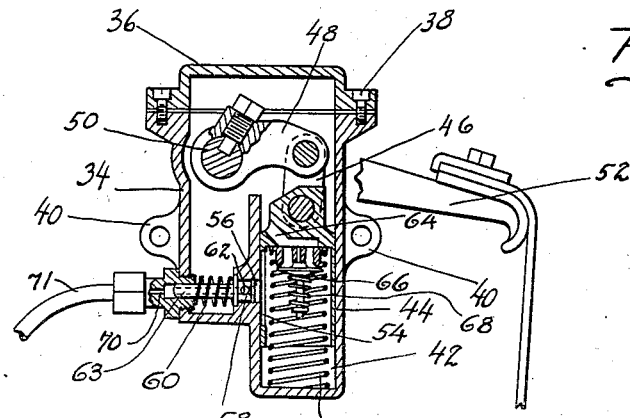
INVENTOR.
George R. Siegrist
BY Parker & Burton
ATTORNEYS

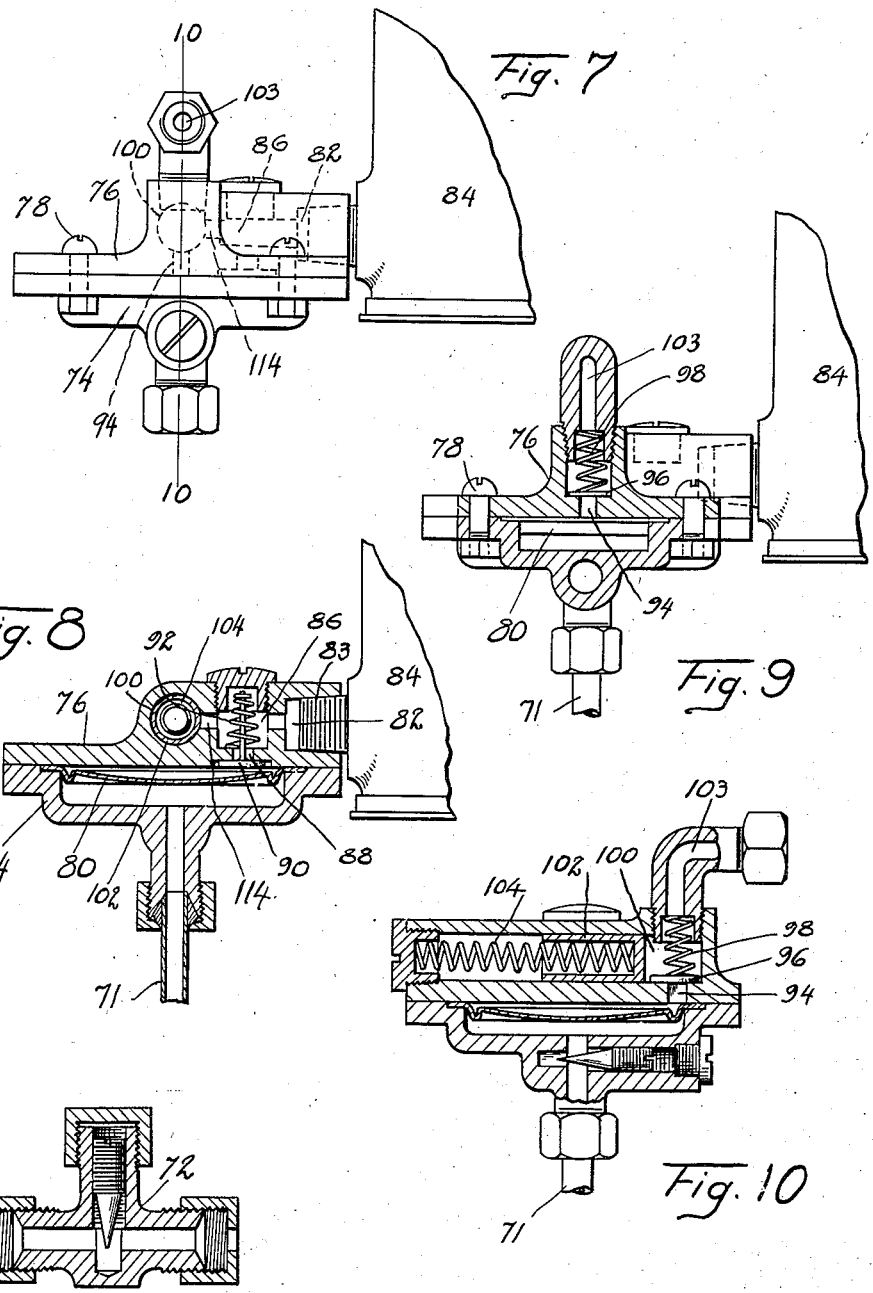

May 28, 1935.  G. R. SIEGRIST  2,003,013
VEHICLE CHASSIS LUBRICATING MECHANISM
Filed Nov. 26, 1929  4 Sheets-Sheet 4
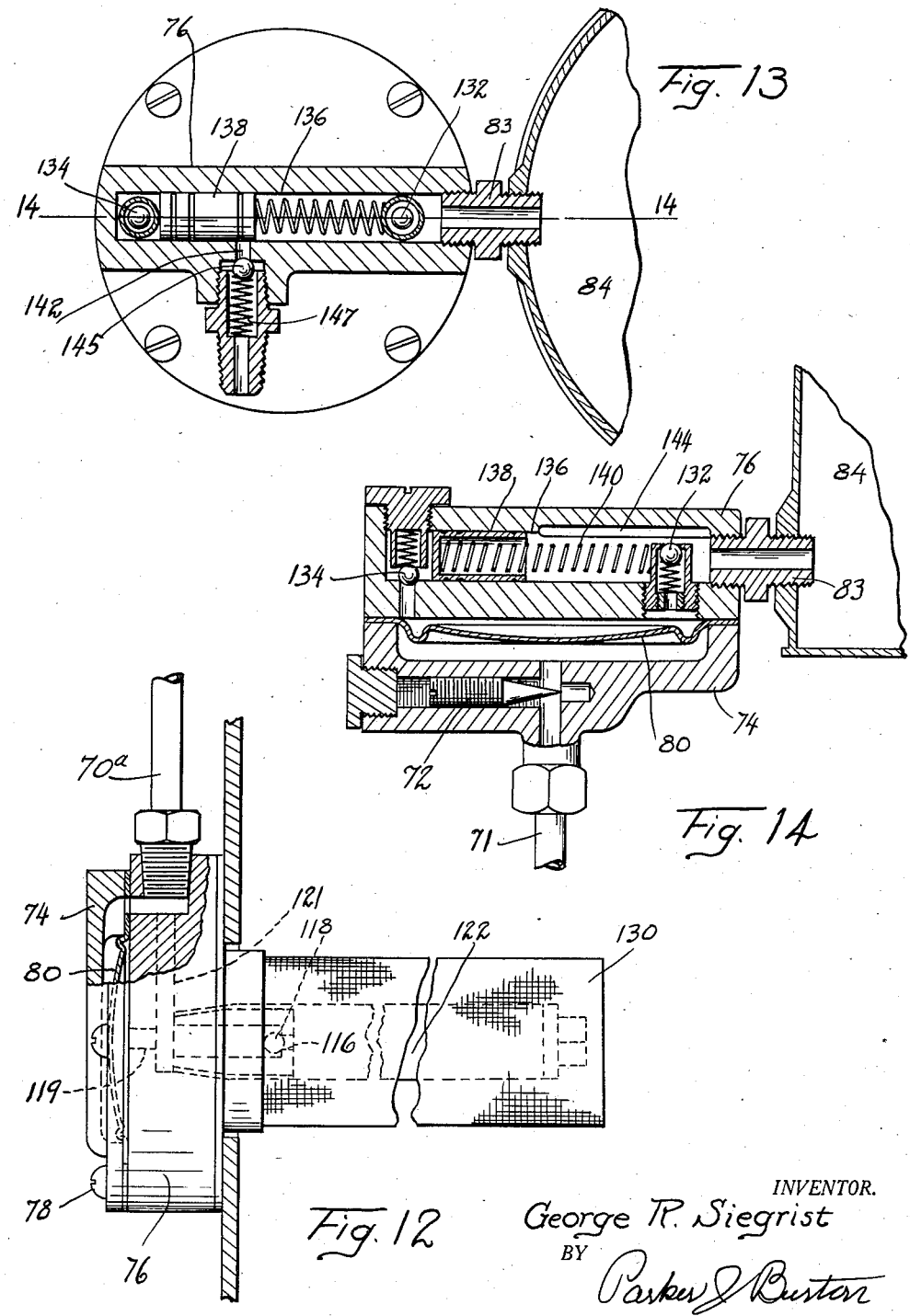
INVENTOR.
George R. Siegrist
BY
Parker & Burton
ATTORNEYS Patented May 28, 1935

2,003,013

UNITED STATES PATENT OFFICE 2,003,013

VEHICLE CHASSIS LUBRICATING MECHANISM

George R. Siegrist, Port Huron, Mich.

Application November 26, 1929, Serial No. 409,944

30 Claims. (Cl. 184—7)

My invention relates to improvements in lubricating mechanism for motor vehicles and particularly to force feed oil lubrication which is coordinated with the operation of shock absorber mechanism provided on the vehicle.

An object is to provide suitable lubricant pumping mechanism responsive to the functioning of fluid shock absorbing mechanism and operable to pump lubricant to parts designed to receive the same.

A feature of my invention is that a suitable source of fluid lubricant may be provided at a convenient place either in an independent reservoir or the usual oil sump of the engine may be employed from which source of lubricant my improved pumping mechanism draws lubricant and urges it under pressure to parts to be lubricated. The pumping mechanism itself is so constructed and arranged that it responds to a determined range of movement or fluid pressure developed in fluid shock absorbing means which means functions in the usual intended manner to damp out the vibration of the vehicle chassis produced by the travel of the vehicle over the road.

The pump mechanism is so constructed that lubricant may be delivered to the system only within a regulated range of pressure as, for example, over a fixed minimum and below a fixed maximum.

Other advantages, meritorious features and desirable attributes of my invention will more fully appear from the following description, appended claims and accompanying drawings, wherein,—

Fig. 1 is a diagrammatic elevation of the chassis of a road vehicle.

Fig. 2 is an enlarged elevation of the forward end of the vehicle chassis showing my improved construction in place.

Fig. 3 is a vertical sectional view through my improved pumping mechanism shown in Fig. 2.

Fig. 4 is a view similar to Fig. 2 showing a modified form of construction.

Fig. 5 is a sectional view taken through the shock absorber casing illustrated in Figs. 2 and 4.

Fig. 6 is a plan of the pumping mechanism shown in Fig. 4.

Fig. 7 is an elevation of the construction shown in plan in Fig. 6.

Figs. 8 and 9 are sectional views taken on lines 8—8 and 9—9 respectively of Fig. 6.

Fig. 10 is a sectional view taken on line 10—10 of Fig. 7.

Fig. 11 is a sectional view through a needle valve coupling shown in Fig. 2.

Fig. 12 is a side elevation of my pump construction shown in Fig. 3.

Fig. 13 is a view similar to Fig. 6, but partly in section, of a modified form of construction.

Fig. 14 is a sectional view taken on line 14—14 of Fig. 13.

In Figs. 1, 2, 3, and 12, I have shown my improved pumping mechanism as adapted to draw lubricant from the oil sump of an engine. In Figs. 4, 6 to 10 inclusive, 13 and 14, I have shown a construction which cooperates with a separate lubricant reservoir that may be mounted on the dash or at some other convenient place. The construction is similar except for changes to accommodate for the difference in arrangement.

In Fig. 1 there is shown the usual road vehicle chassis wherein there is a frame 20 supported by springs upon front and rear axles 22 which carry road wheels 24, and there is shown the dash 26 and the oil sump 28. Fluid shock absorber mechanism, indicated in assembly as 30, is mounted upon the frame 20 and connected with the axle by a flexible strap 32 to function to dampen out chassis vibration produced by travel of the vehicle over the road.

The shock absorber mechanism comprises a casing 34 (Fig. 5) adapted to contain a suitable fluid shock absorbing medium and provided with a cover plate 36 secured in place by screws 38. The casing is provided with perforated ears 40 through which securing means may be extended to fasten the same to the frame.

This shock absorber construction is in its general aspects a common one and the casing has a compression chamber or cylinder 42 within which a piston 44 is operatively disposed and coupled through a link 46, and an arm 48 with a shaft 50 which carries an arm 52 that is connected to the flexible strap that engages the axle whereby the piston is caused to reciprocate within the cylinder to subject the fluid trapped therein to pressure as the chassis vibrates due to road travel.

The piston wall is cut away as at 54 to permit the escape of fluid through the aperture 56 which is closed by the check valve 58, which valve is held to its seat by a spring 60. The valve itself is provided with a fluid outlet 62 to permit the escape of fluid and a hollow stem 63 to permit the escape of fluid to port 70 and conduit 71 to operate the diaphragm pump.

The piston is of a hollow cylindrical character and there is an opening 64 through its head which is closed by an inlet valve 66 normally held to its seat by a spring 68 but which opens upon the upward movement of the piston to permit fluid to enter the compression cylinder. A large spring 69 holds the piston normally upwards. The shock absorber casing has an outlet 70 to a conduit 71 which leads to my improved pumping mechanism and it will be seen that as the piston is forced downwardly in the compression cylinder the fluid in such conduit is subjected to pressure as fluid is ejected through the outlet valve under pressure from the compression cylinder. This conduit terminates at its opposite end upon the closed side of a diaphragm pump so that it establishes a closed circuit between the pump and the shock absorber casing wherein fluid is constantly standing. The construction just described applies to the several figures of the drawings and is applicable to either of Figs. 2 or 4.

In Fig. 2 the lubricant pumping mechanism is shown positioned in the oil sump and the conduit 71 is shown provided with a needle valve adjustment 72 shown in Fig. 11 of the drawings in section whereby the pressure exerted by the shock absorber mechanism upon the pump mechanism may be regulated. A similar valve similarly numbered is provided in Fig. 4.

The pump mechanism shown is of the diaphragm type and comprises a casing formed of two sections. In Figs. 6 to 14 inclusive, this construction is shown in detail. In these figures the casing is shown divided into two half sections, one section being indicated as 74 and the other section as 76. These sections are secured together by suitable fastening means 78. Between these two sections is arranged a spring diaphragm numbered 80, shaped as shown to exert a normal spring tension tending to maintain the same in the normal position as shown in Figs. 8 and 10.

The half section 76 of the diaphragm pump, shown in Figs. 6 to 10 inclusive, is here shown as cut away providing an inlet 82 engaging a coupling 83 leading from a reservoir 84, which reservoir is here shown as secured to the dash. This inlet 82 terminates in a cored out valve chamber 86 having an outlet 88 closed by a valve 90 held to its seat by a spring 92 which opens to admit lubricant to the chamber formed between the casing half 76 and the upper side of the diaphragm 80.

The casing section 76 is provided with a passageway which forms an outlet 94 from said chamber above the diaphragm, which outlet is normally closed by a valve 96 held to its seat by a spring 98 and which opens under an impulse from the diaphragm. This outlet leads to a plunger cylinder or chamber 100 within which is located a plunger or piston 102 held normally to the position shown in Fig. 10 by a spring 104. There is an outlet from this chamber by way of a conduit 103 that extends to a part to be lubricated. In Fig. 1 this conduit extends to a part such as 110 to be lubricated, and a flow metering device or flow resistance 112 is interposed in the feed line adjacent to the part to be lubricated. This flow metering device is adapted to impose a resistance upon the discharge of lubricant over and above a certain amount at determined times.

If the resistance imposed to the discharge of lubricant through the conduit to the part to be lubricated is sufficiently high, the pressure developed by the diaphragm pump will force the piston 102 rearwardly against the spring 104 within the chamber 100 and uncover an outlet from the chamber indicated as 114 which leads through the valve chamber 86 to the reservoir. This provides a relief if the diaphragm pump continues to function after flow of lubricant through conduit 103 is restrained.

In the functioning of this apparatus, the pressure developed in the shock absorber exerts a pressure upon the fluid in conduit 71 which in turn lifts the diaphragm and the diaphragm functions in the usual manner of a diaphragm pump to discharge lubricant under pressure to the part to be lubricated except as the resistance opens the relief valve by depressing the plunger or piston and permits the by-passing of lubricant back into the reservoir as the metering device in the line prevents the discharge of lubricant to the part to be lubricated.

The above construction is shown in conjunction with the lubricant reservoir carried by the dash but the operation is similar when the pump is mounted in the oil sump as shown in Figs. 1, 2, 3 and 12, wherein the oil sump serves as the lubricant reservoir and the pump is mounted therein. The construction of the pump in this instance is substantially the same as above described. It has an inlet 116 from the oil sump, which inlet is closed by a ball check valve 118 which is held to its seat by a spring 120. There is a port 119 which leads to a discharge outlet 121 that communicates through a conduit 103—a, similar to 103, with the part to be lubricated.

There is a relief valve cylinder 122 wherein is mounted a piston 124 held normally as shown in Fig. 3 by a spring 126. This piston may move rearwardly against the tension of this spring when the resistance to the outward flow of lubricant through outlet 121 to the part to be lubricated increases beyond a predetermined value and which, as it moves outwardly, uncovers an outlet from the cylinder indicated as 128 back into the oil sump. This relief valve and inlet valve assembly is enclosed within a screen filter 130.

The conduit from the shock absorber is indicated in this assembly as 70—a instead of 71 and it leads into the top of the diaphragm pump casing as shown in Fig. 12 and to the closed convex side of the diaphragm.

The functioning of this device is substantially identical with that heretofore described and the result is the same except that in this case oil is drawn directly from the normal source of oil supply for the engine to feed the various parts to be lubricated to the chassis.

In Figs. 13 and 14 I have shown what might be considered a preferred embodiment of my diaphragm pump wherein lubricant is drawn from the reservoir through the opening controlled by the check valve 132 into the space on the concave side of the diaphragm and is forced by the diaphragm through the outlet controlled by the check valve 134 into a chamber communicating with cylinder 136 and moves the piston 138 against the tension of the spring 140. When sufficient pressure has been developed to so compress the spring as to uncover the discharge port from the cylinder 142, lubricant is fed to the system. This port 142 appears more plainly in Fig. 13 and there is provided therein a check valve 145 held by spring 147 to its seat.

If the lubricant pressure is increased, either due to rapid pumping or resistance to discharge of lubricant, so that the piston is moved still further rearwardly, it will uncover the by-pass 144 shown as a groove in the cylinder wall leading back to the reservoir. Through this by-pass the lubricant is returned to the reservoir or passed around through the pump.

This construction prevents the flow of lubricant to the part to be lubricated below a certain pressure and releases all that developed above a certain pressure. This provides a permitted range of pressure through which lubricant is delivered to the system and this range may be controlled by suitably positioning the valve opening or varying the resistance of the control valve springs.

This pump mechanism is positioned sufficiently high in the sump to prevent exhaustion of the lubricant supply for the engine.

What I claim is:

1. Vehicle chassis lubricating mechanism comprising, in combination, a vehicle chassis having a fluid pressure shock absorber adapted to place fluid under pressure in response to the shock or road travel of the chassis, a lubricant reservoir separate from said shock absorber, lubricant pumping mechanism communicating with said reservoir and with a part to be lubricated, said pumping mechanism being arranged in a closed circuit with said shock absorber to receive fluid pressure impulses therefrom to respond operatively to draw lubricant from the lubricant reservoir and deliver the same to the part to be lubricated.

2. Vehicle chassis lubricating mechanism comprising, in combination, a vehicle chassis having a fluid pressure shock absorber adapted to place fluid under pressure in response to the shock or road travel of the chassis, a lubricant reservoir independent of said shock absorber, lubricant pumping mechanism communicating with said lubricant reservoir and with a part to be lubricated, said pumping mechanism arranged in a closed circuit with said shock absorber to respond operatively to determined fluid pressure impulses created by said shock absorber to be operatively actuated to draw lubricant from the reservoir and deliver the same to the part to be lubricated.

3. Vehicle chassis lubricating mechanism comprising, in combination, a vehicle chassis provided with a fluid pressure shock absorber adapted to dampen the chassis movement produced by travel over the road and including a shock absorber fluid containing casing and operating means arranged to place fluid therein under pressure, a lubricant reservoir independent of said shock absorber, lubricant pumping mechanism communicating with said reservoir and with a part to receive lubricant, means establishing a closed fluid circuit between said pumping mechanism and shock absorber casing whereby fluid pressure created in the shock absorber casing functions to operatively actuate the pumping mechanism to draw lubricant from the lubricant reservoir and force the same to the part adapted to receive lubricant.

4. Vehicle chassis lubricating mechanism comprising, in combination, a vehicle chassis provided with a fluid pressure shock absorber adapted to dampen the chassis movement produced by travel over the road and including a shock absorber fluid containing casing and operating means arranged to place fluid therein under pressure, a lubricant reservoir independent of said shock absorber, lubricant pumping mechanism including a diaphragm pump one side of which communicates with the lubricant reservoir and the part to be lubricated, and the other side of which communicates with the shock absorber casing to be actuated by fluid pressure created therein to draw lubricant from the reservoir and force the same to the part to be lubricated.

5. Vehicle chassis lubricating mechanism comprising, in combination, a vehicle chassis provided with a fluid pressure shock absorber adapted to dampen the chassis movement produced by travel over the road and including a shock absorber fluid containing casing and operating means arranged to place fluid therein under pressure, a lubricant reservoir independent of said shock absorber, lubricant pumping mechanism including a diaphragm pump, one side of which communicates with the lubricant reservoir and the part to be lubricated and has a relief valve establishing communication with the reservoir, and the other side of which communicates with the shock absorber casing to respond to fluid pressure created therein to draw lubricant from the reservoir and urge the same to the part to be lubricated.

6. Vehicle chassis lubricating mechanism comprising, in combination, a vehicle chassis provided with a fluid pressure shock absorber adapted to dampen the chassis movement produced by travel over the road and including a shock absorber fluid containing casing and operating means arranged to place fluid therein under pressure, a lubricant reservoir independent of said shock absorber, lubricant pumping mechanism including a diaphragm pump one side of which communicates with the lubricant reservoir and the part to be lubricated and a conduit establishing communication between the other side of the diaphragm and the shock absorber whereby the diaphragm responds to fluid pressure created in the shock absorber casing to draw lubricant from the reservoir and urge the same to the part to be lubricated.

7. Lubricating and shock absorbing mechanism for an automotive road vehicle having an oil reservoir for the engine thereof and provided with fluid pressure shock absorbing mechanism including a fluid containing casing and means responsive to the travel of the vehicle over the road to place fluid therein under pressure, lubricant pumping mechanism arranged in the oil reservoir communicating therewith and with a part to receive lubricant, said pumping mechanism communicating with the shock absorbing casing to operatively respond to fluid pressure created therein to draw lubricant from the oil reservoir and discharge it to the part to receive lubricant.

8. Lubricating and shock absorbing mechanism for a motor vehicle having an oil sump for the engine and provided with a fluid pressure shock absorber responsive to place fluid therein under pressure to dampen the shock of travel of the vehicle over the road, lubricant pumping mechanism arranged in said oil sump communicating therewith to draw lubricant therefrom and with a part to be lubricated to deliver lubricant thereto, said pumping mechanism communicating through a closed fluid circuit with the shock absorber to operatively respond to fluid pressure impulses created therein to draw lubricant from the oil sump and discharge it under pressure to the part to be lubricated.

9. Lubricating and shock absorbing mechanism for a motor vehicle having an oil sump for the engine and provided with a fluid pressure shock absorber responsive to place fluid therein under pressure to dampen the shock of travel of the vehicle over the road, lubricant pumping mechanism arranged in said oil sump communicating therewith to draw lubricant therefrom and with a part to be lubricated to deliver lubricant thereto, said pumping mechanism communicating through a closed fluid circuit with the shock absorber to the casing to operatively respond to fluid pressure impulses created therein to draw lubricant from the oil sump and discharge it under pressure to the part to be lubricated, and a relief valve for the pump adapted to discharge lubricant back into the sump.

10. Lubricating mechanism for a motor vehicle comprising, in combination with a vehicle having a part to be lubricated, pump mechanism communicating with said part to be lubricated to deliver lubricant thereto including a source of lubricant, hydraulic shock absorber mechanism mounted on the vehicle to dampen the movement thereof produced by road travel by subjecting contained liquid to varying pressures, said pump mechanism operably responsive to variations in liquid pressure within the shock absorber mechanism to pump lubricant to the part to be lubricated and including means operable to restrain the flow of lubricant to said part below a determined pressure built up by said pump.

11. Lubricating mechanism for a motor vehicle comprising, in combination with a vehicle having a part to be lubricated, pump mechanism communicating with said part to be lubricated to deliver lubricant thereto including a source of lubricant, hydraulic shock absorber mechanism mounted on the vehicle to dampen the movement thereof produced by road travel by subjecting contained liquid to varying pressures, said pump mechanism operably responsive to the variations in liquid pressure within the shock absorber mechanism to pump lubricant to the part to be lubricated and including means operable to restrain the flow of lubricant to said part except within a predetermined range of pressure built up by said pump which range lies between a determined minimum and a determined maximum.

12. Lubricating mechanism for a motor vehicle comprising, in combination with a vehicle having a part to be lubricated, and a fluid pressure shock absorber to cushion the shock of road travel of the vehicle, pump mechanism communicating with said part to be lubricated to deliver lubricant thereto and coupled with the shock absorber to operatively respond to fluid pressure developed therein to be actuated thereby to pump lubricant to the part to be lubricated, said pump mechanism including means operable to control the flow of lubricant to the part to be lubricated and responsive to the fluid pressure developed by said pump to deliver lubricant only throughout a predetermined limited range of pressure built up by the pump below a fixed maximum and above a fixed minimum.

13. In a vehicle having road wheels, a spring supported chassis and a part to be lubricated, hydraulic shock absorber mechanism arranged to dampen the chassis movement produced by travel of the vehicle over the road and including contained liquid and mechanism operable upon road shocks to subject said liquid to varying pressures, lubricant pumping mechanism communicating with the part to be lubricated to deliver lubricant thereto and including a lubricant reservoir, said pumping mechanism communicating with the shock absorbing mechanism to respond operatively to varying liquid pressures produced within the shock absorbing mechanism to pump lubricant to the part to be lubricated.

14. In a vehicle having road wheels, a spring supported chassis and a part to be lubricated, hydraulic shock absorber mechanism arranged to dampen the chassis movement produced by travel of the vehicle over the road and including contained liquid and mechanism operable upon road shocks to subject said liquid to varying pressures, lubricant pumping mechanism communicating with the part to be lubricated to deliver lubricant thereto and including a lubricant reservoir, said pumping mechanism communicating with the shock absorbing mechanism to respond operatively to varying liquid pressures produced within the shock absorbing mechanism to pump lubricant to the part to be lubricated, and means operable to control the response of said pump to said varying lubricant pressures produced in the shock absorbing mechanism.

15. In a vehicle having road wheels, a spring supported chassis and a part to be lubricated, hydraulic shock absorber mechanism arranged to dampen the chassis movement produced by travel of the vehicle over the road and including contained liquid and mechanism operable upon road shocks to subject said liquid to varying pressures, lubricant pumping mechanism communicating with the part to be lubricated to deliver lubricant thereto and including a lubricant reservoir, said pumping mechanism communicating with the shock absorbing mechanism to respond operatively to varying liquid pressures produced within the shock absorbing mechanism to pump lubricant to the part to be lubricated, and means operable upon resistance beyond a determined point to discharge of lubricant from said pump to the part to be lubricated to cause said pump to discharge lubricant back into the lubricant reservoir.

16. In a vehicle having road wheels, a spring supported chassis and a part to be lubricated, hydraulic shock absorber mechanism arranged to dampen the chassis movement produced by travel of the vehicle over the road and including contained liquid and mechanism operable upon road shocks to subject said liquid to varying pressures, lubricant pumping mechanism communicating with the part to be lubricated to deliver lubricant thereto and including a lubricant reservoir, said pumping mechanism communicating with the shock absorbing mechanism to respond operatively to varying liquid pressures produced within the shock absorbing mechanism to pump lubricant to the part to be lubricated, and means operable upon resistance beyond a determined point to discharge of lubricant from said pump to the part to be lubricated to permit said pump to continue to discharge said lubricant and to by-pass the same about said part to be lubricated.

17. In a vehicle having road wheels, a spring supported chassis, and a part to be lubricated, hydraulic shock absorbing mechanism arranged to dampen chassis movement produced by travel of the vehicle over the road, lubricant pumping mechanism communicating with the part to be lubricated, a reservoir for lubricant, said pumping mechanism communicating on one side with the shock absorbing mechanism to be actuated by variations in liquid pressure produced therein by travel of the vehicle over the road and communicating on the opposite side with the part to be lubricated and the lubricant reservoir.

18. Vehicle chassis lubricating mechanism comprising, in combination with a vehicle chassis provided with a shock absorber responsive to the shock of road travel of the chassis, a lubricating system including a part to receive lubricant and a lubricant container communicating therewith and means operable to force lubricant from the container to the part to be lubricated, said means coupled with the shock absorber to be operatively actuated by the response thereof to the shock of road travel of the chassis.

19. Vehicle chassis lubricating mechanism comprising, in combination with a vehicle chassis provided with a shock absorber having a part operably responsive to the shock of road travel of the chassis, lubricant pressure mechanism communicating with said part and operably responsive to the movement of that part of the shock absorber which is itself operably responsive to the road travel of the chassis to be actuated thereby to deliver lubricant to the part to be lubricated.

20. Vehicle chassis lubricating mechanism comprising, in combination, a vehicle chassis having a liquid pressure shock absorber provided with a piston responsive to the shock of road travel of the chassis, lubricant pressure mechanism connected with a part to receive lubricant and operably responsive to the movement of said piston in response to road travel of the chassis to be actuated to deliver lubricant to the said part.

21. Vehicle chassis lubricating mechanism comprising, in combination, a vehicle chassis having a liquid pressure shock absorber adapted to place liquid under pressure in response to the shock or road travel of the chassis, lubricant pressure mechanism communicating with the part to be lubricated and coupled with the shock absorber to operably respond to liquid pressure created in the shock absorber to deliver lubricant to the part to be lubricated.

22. Vehicle chassis lubricating mechanism comprising, in combination, a vehicle chassis having a liquid pressure shock absorber adapted to subject liquid therein to pressure in response to the shock of road travel of the chassis, lubricant pressure mechanism communicating with a part to be lubricated and with the liquid pressure shock absorber to operably respond to liquid pressure created therein by travel of the chassis over the road to deliver lubricant to the part to be lubricated.

23. Vehicle chassis lubricating mechanism comprising, in combination, a vehicle chassis having a liquid pressure shock absorber adapted to subject liquid therein to pressure in response to the shock of road travel of the chassis to cushion the same, lubricant pressure mechanism connected with a part to be lubricated and with the liquid pressure shock absorber to operably respond to a determined minimum of liquid pressure created therein by travel of the chassis over the road to deliver lubricant to the part to be lubricated.

24. In a vehicle having a liquid pressure shock absorber provided with a compression chamber and means to place the liquid under pressure therein to cushion the road travel of the vehicle, a part to be lubricated, a source of lubricant, liquid pressure responsive pumping mechanism communicating therewith and having a part arranged to be operably actuated by liquid pressure developed in the compression chamber to deliver lubricant under pressure to the part to be lubricated.

25. In a vehicle having road wheels and a frame spring supported thereby, liquid pressure shock absorbing mechanism coupled with the frame and the wheels and including a liquid pressure chamber and means operable to place the liquid therein under pressure to resist the relative movement of the frame and wheels, said vehicle having a part to be lubricated, and lubricant delivery mechanism communicating with said part and operably responsive to liquid pressure developed in the shock absorber compression chamber through the functioning thereof.

26. Vehicle chassis lubricating mechanism comprising, in combination, a vehicle chassis having a liquid pressure shock absorber provided with a piston operable in the compression chamber to eject liquid therefrom under pressure in response to the shock of road travel of the chassis to cushion the same, lubricant pressure mechanism communicating with a part to be lubricated and with the liquid pressure shock absorber to operably respond to the ejection of liquid under pressure from the compression chamber of the shock absorber during the operation thereof to deliver lubricant to the part to be lubricated.

27. Vehicle chassis lubricating mechanism comprising, in combination, a vehicle chassis having a liquid pressure shock absorber provided with a piston operable in the compression chamber to eject liquid therefrom under pressure in response to the shock of road travel of the chassis to cushion the same, lubricant pressure mechanism including a pump communicating with the part to be lubricated and with the liquid pressure shock absorber compression chamber to operably respond to the ejection of liquid therefrom under pressure by the movement of the piston therein in response to the shock of road travel of the chassis to deliver lubricant to the part to be lubricated.

28. Vehicle chassis lubricating mechanism comprising, in combination, a vehicle chassis having a liquid pressure shock absorber provided with a piston operable in the compression chamber to eject liquid therefrom under pressure in response to the shock of road travel of the chassis to cushion the same, lubricant pressure mechanism including a pump communicating with the part to be lubricated and with the liquid pressure shock absorber compression chamber to receive liquid pressure impulses therefrom and operably responsive thereto to deliver lubricant under pressure to the part to be lubricated.

29. A centralized lubricating system comprising the combination of bearings to be lubricated, a pipeline system therefor, a reservoir for lubricant, a lubricating pump connected between the reservoir and the pipeline system, a fluid shock observer, and a fluid pressure motor operated by the pressure of fluid in the shock absorber for actuating the pump.

30. In combination a centralized lubricating system comprising an oil supply reservoir, a pipeline system connected thereto and leading to the bearings to be lubricated, a hydraulic shock absorber having a body of liquid adapted to be subjected to varying pressure and a pressure responsive member separating said body of liquid from the liquid in the centralized lubricating system, said pressure responsive member being arranged to be actuated by the variations in pressure in said hydraulic shock absorber.

GEORGE R. SIEGRIST.